(No Model.)
A. P. FERGUSON.
TWO WHEELED VEHICLE.
No. 362,733            Patented May 10, 1887.
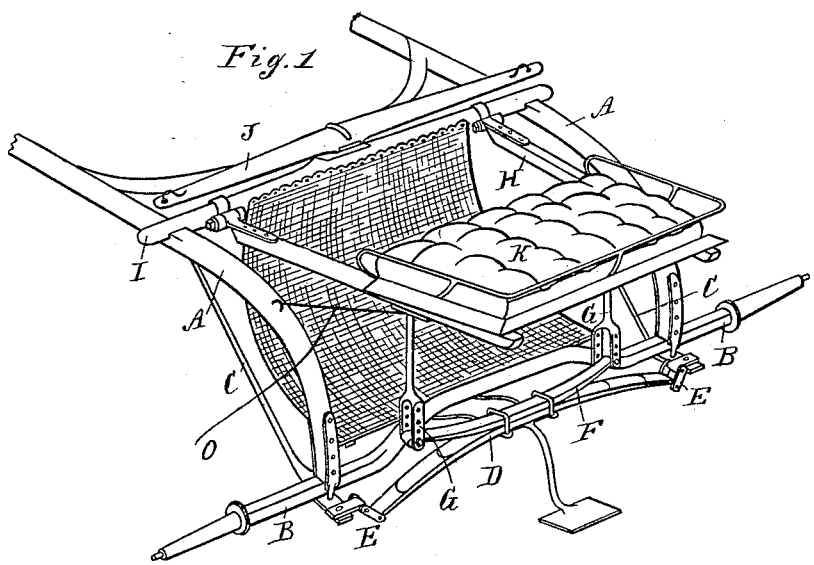
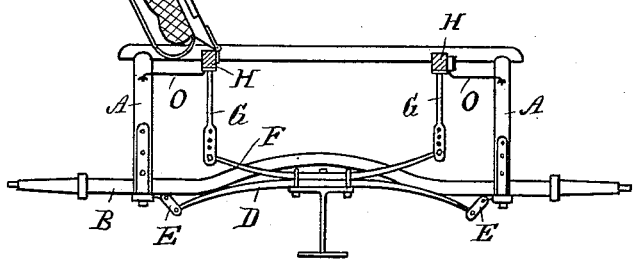
Attest:
John Schuman.
Inventor:
Alvah P. Ferguson.
by his Att'y

United States Patent Office.

ALVAH P. FERGUSON, OF DEXTER, MICHIGAN.

TWO-WHEELED VEHICLE.

SPECIFICATION forming part of Letters Patent No. 362,733, dated May 10, 1887.

Application filed October 28, 1886. Serial No. 217,417. (No model.)

*To all whom it may concern:*

Be it known that I, ALVAH P. FERGUSON, of Dexter, in the county of Washtenaw and State of Michigan, have invented new and useful Improvements in Two-Wheeled Vehicles; and I do hereby declare that the following is a full, clear, and exact description thereof, reference being had to the accompanying drawings, which form a part of this specification.

This invention relates to certain new and useful improvements in two-wheeled vehicles.

The object of the invention is to so construct and arrange the seat designed to be occupied by the driver that it can readily be adjusted vertically, so as to be brought upon nearly a level when attached to horses of a different size, and wherein an entrance to the vehicle is obtained without the necessity of passing between the ends of the seat and the wheels.

To this end the invention consists in the peculiar construction, arrangement, and combination of the various parts, all as more fully hereinafter set forth.

Figure 1 is a perspective view of my improved device with the wheels removed and seat closed. Fig. 2 is a rear elevation of the same with the seat open.

In the accompanying drawings, which form a part of this specification, A represents the thills, the heels or rear ends of which are rigidly secured in any suitable manner to the axle B.

In the accompanying illustration, Fig. 1, the brace-bars C of the shafts terminate in elongations, to the rear of which are secured the ends of the riding-spring D by any suitable and proper shackles, E, and upon the top of this riding-spring D is centrally secured a bar-spring, F, to the ends of which are adjustably secured the lower ends of standards G, the upper ends of which are rigidly secured to the seat-bars H, the forward ends of the latter being pivotally secured to the cross-bar I of the shafts, to which latter the whiffletree J is pivotally secured, as in the ordinary manner. The seat K is pivotally secured or hinged to one of the seat-bars H, when its opposite end is provided with a U-shaped bracket, L, designed to slip over the opposite seat-bar and to be retained in place by any suitable spring latch or hook.

O are lateral brace-rods between each seat-bar H and the adjoining thill, giving rigidity to the seat-support.

It will be observed that in this construction the seat has a practically independent movement from the shaft—that is, in driving over an obstruction or a sudden rise in the roadway the driver upon the seat K rises entirely upon the springs D F without imparting any motion to the shafts forward of the cross-bar, and hence there is no liability of "breaking" the horse in speeding; and it will also be observed that by disengaging the free end of the seat from its spring-latch it can readily be turned into the position shown in Fig. 2, when those desiring to ride can readily enter the vehicle by stepping upon the step M, thus mounting the vehicle in front of the step and dropping the latter behind them.

It is obvious that, should it be desired to use a longer spring than one which would fit between the clips which secure the shafts and the axle, an independent clip and shackle may be employed between such shafts and the collar of the axle to which to secure the ends of the spring without departing from the spirit of my invention.

What I claim as my invention is—

1. In a two-wheeled cart, the combination of the shaft-bar, the seat-bars having their forward ends pivotally secured to the shaft-bar, the riding-spring, the bar-spring centrally supported by the riding-spring underneath the seat, vertical seat-bar supports connected at their lower ends to the respective ends of the bar-spring, and lateral brace-rods between each seat-bar and the adjoining thill, all substantially as described.

2. In a two-wheeled cart, the combination of the shaft-bar, the seat-bars having their forward ends pivotally secured to the shaft-bars, a vertical support for each seat-bar, rigidly secured at its upper end to the seat-bar and vertically adjustably secured at its lower end to a bar-spring connecting the two, a suitable riding-spring centrally supporting said bar-spring, and lateral brace-rods between each seat-bar and the adjoining thill, all substantially as described.

3. In a two-wheeled cart, the combination of hinged seat-bars each independently supported by a vertical support near the rear end and a lateral brace from the adjoining rear end of the thills, substantially as described, and of a seat hinged to one of the seat-bars, all arranged substantially as and for the purposes specified.

ALVAH P. FERGUSON.

Witnesses:
  E. SCULLY,
  H. S. SPRAGUE.